United States Patent
Ishii et al.

(10) Patent No.: US 10,764,088 B2
(45) Date of Patent: Sep. 1, 2020

(54) COMMUNICATION SYSTEM, COMMUNICATION APPARATUS, COMMUNICATION METHOD, TERMINAL, NON-TRANSITORY MEDIUM

(71) Applicant: NEC CORPORATION, Minato-ku (JP)

(72) Inventors: Satoru Ishii, Tokyo (JP); Hideo Hasegawa, Tokyo (JP); Shintaro Nakano, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 16/386,896

(22) Filed: Apr. 17, 2019

(65) Prior Publication Data

US 2019/0253275 A1    Aug. 15, 2019

Related U.S. Application Data

(63) Continuation of application No. 15/745,257, filed as application No. PCT/JP2016/070903 on Jul. 14, 2016, now Pat. No. 10,313,156.

(30) Foreign Application Priority Data

Jul. 17, 2015    (JP) .................... 2015-143404

(51) Int. Cl.
*H04L 12/46*    (2006.01)
*H04L 12/66*    (2006.01)
*H04W 84/12*    (2009.01)
*H04L 12/28*    (2006.01)

(52) U.S. Cl.
CPC ...... *H04L 12/4641* (2013.01); *H04L 12/4633* (2013.01); *H04L 12/66* (2013.01); *H04L 12/2854* (2013.01); *H04W 84/12* (2013.01)

(58) Field of Classification Search
CPC ......... H04L 12/4641; H04L 2012/5621; H04L 49/354; H04L 29/06612; H04L 45/586; H04L 49/70; H04L 63/0272
See application file for complete search history.

(56) References Cited

U.S. PATENT DOCUMENTS 9,258,742 B1    2/2016  Pianigiani et al.
9,509,680 B2    11/2016  Suzuki
(Continued)

FOREIGN PATENT DOCUMENTS

EP    2306676 A1    4/2011
JP    2004-135248 A    4/2004
(Continued)

OTHER PUBLICATIONS

Communication dated Jul. 23, 2019, from the Japanese Patent Office in application No. 2018-181136.
(Continued)

*Primary Examiner* — Ashley Shivers
(74) *Attorney, Agent, or Firm* — Sughrue Mion, PLLC

(57) ABSTRACT

The present invention provides secure communication between a data center, in which a wide area network (WAN) is interposed between the data center and a wireless LAN to which a terminal connects to, comprises a VPN apparatus (GW) that connects with the terminal using a VPN through the wide area network and the wireless LAN; and a virtual core network virtualizing at least a part of constituent elements of a core network, wherein the VPN apparatus is connected to the virtual core network, and the terminal communicates with a connection destination, from the VPN via the VPN apparatus, via the virtual core network, and further via a packet data network to which the virtual core network connects.

12 Claims, 10 Drawing Sheets

(56) References Cited

U.S. PATENT DOCUMENTS

| | | |
|---|---|---|
| 9,642,077 B2 | 5/2017 | Mathai et al. |
| 2004/0037260 A1 | 2/2004 | Kakemizu et al. |
| 2006/0161771 A1 | 7/2006 | Zhang |
| 2011/0200005 A1 | 8/2011 | Park et al. |
| 2013/0054761 A1 | 2/2013 | Kempf et al. |
| 2013/0121207 A1 | 5/2013 | Parker |
| 2015/0106901 A1 | 4/2015 | Suzuki |
| 2015/0109995 A1 | 4/2015 | Mathai et al. |
| 2015/0143368 A1 | 5/2015 | Bugenhagen |
| 2015/0173111 A1 | 6/2015 | Agarwal et al. |
| 2015/0339159 A1 | 11/2015 | Gupta et al. |
| 2016/0249353 A1 | 8/2016 | Nakata et al. |
| 2017/0238245 A1 | 8/2017 | Mathai et al. |
| 2017/0250917 A1 | 8/2017 | Ruckstuhl et al. |

FOREIGN PATENT DOCUMENTS

| | | |
|---|---|---|
| JP | 2005536154 A | 11/2005 |
| JP | 2006-033443 A | 2/2006 |
| JP | 2006074445 A | 3/2006 |
| JP | 2009089062 A | 4/2009 |
| JP | 2010-231396 A | 10/2010 |
| JP | 2011-507449 A | 3/2011 |
| JP | 201191796 A | 5/2011 |
| JP | 2012-165199 A | 8/2012 |
| JP | 2013090288 A | 5/2013 |
| JP | 2014-195167 A | 10/2014 |
| JP | 2014531792 A | 11/2014 |
| WO | 2013/190688 A1 | 12/2013 |
| WO | 2015/056392 A1 | 4/2015 |

OTHER PUBLICATIONS

Next-generation Wi-Fi Calling Using IMS and 3GPP Wi-Fi Access, Aptilo, Internet search (searched on Apr. 26, 2015) <URL:http://www.aptilo.com/wi-fi-calling/next-generation-wi-fi-calling-solution>, 2 pages.

Decision to Grant a Patent dated Aug. 28, 2018 issued by the Japanese Patent Office in counterpart application No. 2017-529864.

International Search Report for PCT/JP2016/070903 dated Oct. 4, 2016 [PCT/ISA/210].

FIG. 3A

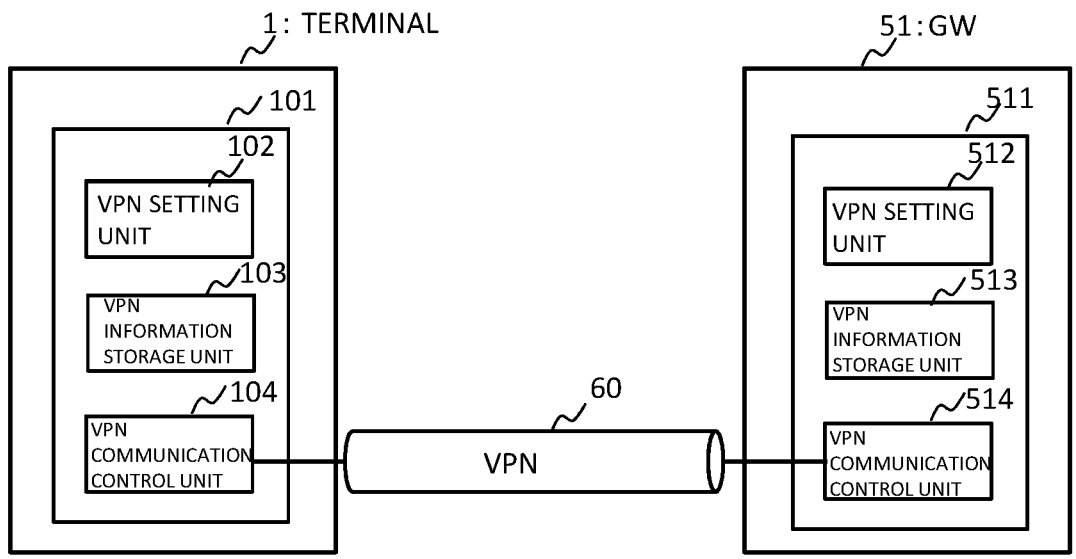

FIG. 3B

| VPN ID | CONNECTION DST ADDRESS | TERMINAL ID/NAME | Pre-shared key | APPARATUS ADDRESS | AUTHENTICATION ALGORITHM | ENCRYPTION ALGORITHM | CONNECTION NETWORK | NAT TRAVERSAL | ... |
|---|---|---|---|---|---|---|---|---|---|
| VPN1 | 100.1.100.1 | smart1 | secret1 | 100.1.1.1 | SHA-1 | AES | 100.1.100.1/32 | PRESENT | |
| VPN2 | 100.1.100.2 | smart2 | secret2 | 100.1.1.1 | SHA-1 | DES | 100.1.100.2/32 | PRESENT | |
| VPN3 | 100.1.100.3 | smart3 | secret3 | 100.1.1.1 | SHA-1 | 3DES | 100.1.100.3/32 | PRESENT | |
| ⋮ | | | | | | | | | |

FIG. 3C

| VPN ID | CONNECTION DST GW ADDRESS | CONNECTION DST GW NAME | Pre-shared key | CLIENT ADDRESS | AUTHENTICATION ALGORITHM | ENCRYPTION ALGORITHM | CONNECTION NETWORK | NAT TRAVERSAL | ... |
|---|---|---|---|---|---|---|---|---|---|
| VPN1 | 100.1.1.1 | example.dc.com | secret1 | 100.1.100.1 | SHA-1 | DES | 100.1.1.0/24 | PRESENT | |

COMMUNICATION SYSTEM, COMMUNICATION APPARATUS, COMMUNICATION METHOD, TERMINAL, NON-TRANSITORY MEDIUM

DESCRIPTION OF RELATED APPLICATION

This application is a Continuation of U.S. application Ser. No. 15/745,257, filed Jan. 16, 2018, now U.S. Pat. No. 10,313,156 issued Jun. 4, 2019, which is a National Stage of International Application No. PCT/JP2016/070903 filed Jul. 14, 2016, claiming priority based on Japanese Patent Application No. 2015-143404 filed Jul. 17, 2015, the contents of all of which are incorporated herein by reference in their entirety.
Evolved Packet System (EPS) includes 3GPP (3rd Generation Partnership Project) access network as well as non-3GPP access network. The 3GPP access network includes UTRAN (UMTS (Universal Mobile Telecommunications System) Terrestrial Radio Access Network), E-UTRAN (Evolved UTRAN), GERAN (GSM (Registered Trademark) (Global system for mobile communications) (EDGE Radio Access Network) and so forth.

FIELD

The present invention relates to a communication system, an apparatus, a method, a terminal, and a non-transitory medium.

BACKGROUND

The Non-3GPP access network is an IP (Internet Protocol) access network using an access technology with specifications outside a scope of 3GPP. The Non-3GPP access network includes a Wi-Fi (Wireless Fidelity) network (registered trademark: Wireless Fidelity) specified by the IEEE (Institute of Electrical and Electronics Engineers, Inc.) 802.11x standard and a wireless LAN (Wireless Local Area Network: WLAN) such as WiMAX (Worldwide Interoperability for Microwave Access) specified by the IEEE 802.16 standard. For non-3GPP access, for example, reference may be made to 3GPP TS 23.402: Architecture enhancements for non-3GPP accesses, or the like.

Wi-Fi (registered trademark)-Calling is a Voice over IP (VoIP) service provided on a Wi-Fi (registered trademark) network by a communication carrier (operator). For example, a terminal (User Equipment (UE)) into which a SIM (Subscriber Identity Module) of a communication carrier is inserted is connected to a security gateway of the communication carrier via a Wi-Fi (registered trademark) network, and when authenticated with SIM authentication by the security gateway, the terminal (User Equipment (UE)) is connected to an exchange node of a core network (Evolved Packet Core: EPC), thereby making it possible for the terminal to use a voice call service based on a telephone number and Short Message Service (SMS), etc., each provided by the communication carrier (Non-Patent Literature 1). Further, when the terminal is connected to Wi-Fi (registered trademark) and Wi-Fi (registered trademark)-Calling is set on in the terminal, the security gateway, on reception of an incoming call to the terminal calls the terminal via a Wi-Fi (registered trademark) network.

FIG. 1 is a diagram illustrating an EPS including a non-3GPP access network. A terminal (UE) 1 such as a smartphone can connect to a packet data network (PDN) 30 via a base station (evolved Node B: eNB) 10 of a communication carrier and an EPC 20, or can connect to the Internet via a wireless LAN such as a Wi-Fi (registered trademark).

An MME (Mobility Management Entity) 23 of EPC 20 performs various processing such as mobility management and authentication of the terminal 1, setting of a user data transfer route, and the like. In addition, the MME 23 performs user authentication, or the like. In cooperation with an HSS 24 (Home Subscriber Server which holds subscriber profile). The MME 23 establishes/releases a user data transfer route in a section (S1-U) from an SGW (Serving Gateway) 21 to the base station 10. The SGW 21 exchanges user data with the base station 10, for example, and establishes/releases a communication path between the SGW 21 and a PGW (Packet Data Network) PDN 22. The PGW 22 connects to a packet data network (PDN) 30 such as IMS (Internet Multimedia Subsystem) or the Internet, for example. Further, the PGW 22 performs, for example, allocation of an IP address (private IP address) to the terminal 1 and so forth. A PCRF (Policy and Charging Rules Function) 26 determines a policy control such as QoS (Quality of Service) and a charging control rule. Based on notification information from the PCRF 26, the PGW 22 and SGW 21 perform policy control, on a per packet basis, for example. In FIG. 1, a line S 11 or the like between respective nodes represents an interface, a broken line represents a control plane (C-Plane), and a solid line represents a signal (data) of a user plane (U-Plane). For details of the EPC, reference may be made to, for example, 3GPP TS 23.401: GPRS Enhancements for E-UTRAN Access or the like.

In Wi-Fi (registered trademark)-Calling, etc., a call request from the terminal 1 is forwarded, as an Un-Trusted Access (unreliable access), via a wireless LAN access point 41 and via an ePDG (evolved packet data gateway) 27 of a communication carrier to the PGW 22, and is then connected to PDN 30 (for example, IMS service).

The ePDG 27 is an IPsec gateway that terminates an IPsec (Security Architecture for Internet Protocol) connection from a mobile interface (Swu). When the terminal (UE) 1 switches to a non-3GPP access that is not trusted in security, or the terminal (UE) 1 first connects to a non-3GPP access, the terminal 1 detects an ePDG 27 and performs key exchange (IKEv2) with the ePDG 27, and establishment of an IPsec tunnel, and then establishes a PDN (Packet Data Network) connection with the PGW 22 over the established IPsec tunnel. In order for the terminal 1 to access the non-3GPP access network, it is necessary to perform authentication. The ePDG 27 relays an EAP (Extensible Authentication Protocol) message from the terminal 1 to a 3GPP AAA (Authentication Authorization Accounting) server 25. The 3GPP AAA server 25 performs EAP-SIM (Extensible Authentication Protocol-Subscriber Identity Module) Authentication, or EAP-AKA (Extensible Authentication Protocol-Authentication and Key Agreement) authentication (reference may be made to 3GPP TS 33.402: Security aspects of non-3GPP accesses, etc., for example).

The ePDG 27 sets up a tunnel (Proxy Mobile IP or GPRS (General Packet Radio System) Tunneling Protocol) toward the PGW 22 in S2b interface (reference may be made to 3GPP TR 23.834: Study on GPRS Tunneling Protocol (GTP) based S2b etc., for example).

When the non-3GPP access is compatible with PMIPv6 (Proxy Mobile IPv6), the ePDG 27 can connect to the PGW 22 via PMIPv6. In the case of using a proxy mobile IP between the PGW 22 and the ePDG 27, when an IPsec tunnel is established between the terminal 1 and the ePDG 27, the ePDG 27 transmits a proxy binding update message to the PGW 22. As a result, a transmission destination of data to the terminal 1 in the PGW 22 is switched to the ePDG 27. Note that PMIPv6 is a mobility control protocol (MAC) that establishes and releases a tunnel for data transfer (GRE (Generic Routing Encapsulation) tunnel) between a mobility anchor (LMA: Local Mobility Anchor) and a mobility access gateway (MAG: Mobility Access Gateway) (reference may be made, for example, IETF (The Internet Engineering Task Force) RFC (Request For Comments) 5213, etc.). The LMA forwards a packet to the MAG to which the terminal connects (switches a communication route and forwards the packet addressed to the terminal to a visiting area). When a terminal moves from one MAG to a different MAG, a tunnel for data forwarding is established between the LMA that has established the data forwarding tunnel before and ta MAG to which the terminal newly connects.

The 3GPP AAA server 25 provides network access authentication, authorization, and accounting services from users. Authorization of non-3GPP access is performed among terminal 1, 3GPP AAA server 25, and HSS 24. For example, when the terminal 1 establishes an IPsec tunnel with the ePDG 27, mutual authentication is performed between the terminal 1 and the network based on, for example, EAP-AKA.

When the terminal 1 moves or first connects to the trusted non-3GPP access (trusted wireless LAN access point 42 in FIG. 1), the MIP (Mobile IP) tunnel (S2a, DSMIPv 6 (Dual-Stack MIPv 6): reference may be made to IETF RFC 5555) directly to the PGW 22. As for ePDG and 3GPP AAA server, reference may be made, for example, to 3GPP TS 29.273: Evolved Packet System (EPS); 3GPP EPS AAA interfaces or the like. Whether the non-3GPP access network is a trusted access network or an untrusted access network is determined by, for example, a communication carrier (operator) of a HPLMN (Home Public Land Mobile Network) to which a subscriber is registered.

IPSec is a protocol that encrypts and authenticates packets at a network layer level. AH (Authentication Header) performs authentication of such as connection destination of a VPN (Virtual Private Network), presence or absence of tampering in a packet (reference may be made to IETF RFC 2402). ESP (Encapsulating Security Payload) performs packet encryption and authentication (connection destination/packet falsification) (reference may be made to IETF RFC 2406). For IPSec communication, there are a transport mode (IPsec between hosts on which IPsec is implemented) and a tunnel mode (IPsec between VPN apparatuses such as routers equipped with IPsec). In the transport mode, data of layer 4 or more of a packet is encrypted (see FIG. 10B), and the packet is forwarded based on an original IP header (Original IP header). In the tunnel mode, an original IP header and data part (FIG. 10A) of a packet are encrypted and a new IP header (New IP header) is added (see FIG. 10C).

An ESP packet has a format including an ESP header, a payload, an ESP trailer, and authentication data (ESP Authentication data) (see FIG. 10B and FIG. 10C).

The ESP header (ESP header) includes an SPI (Security Parameter Index: a 32-bit value uniquely identifying an SA (Security Association) for that datagram), and a sequence number (sequence number of the packet: 32 bits).

The ESP trailer includes a padding (padding field for adjusting payload length), a pad length (number of bytes of padding), a next header (Protocol after ESP: TCP (Transmission Control Protocol)/UDP (User Datagram Protocol)).

Authentication data (HMAC (Hash-based Message Authentication Code)) is a variable length field including an Integrity Check Value (ICV) calculated from an ESP packet except authentication data.

A security association (SA), which is a logical connection, is established between VPN apparatuses for performing IPsec communication. Since SA is a one-way tunnel, two SAs are provided for transmission and reception of packets. SA is established for each traffic that performs VPN communication. SA includes IPsec parameters (security information) (e.g., SPI (Security Parameter Index), mode, protocol, cryptographic algorithm, key, authentication algorithm, IP address of tunnel endpoint, etc.).

IKE (Internet Key Exchange) is a key exchange protocol for SA setting (regarding IKEv2, reference may be made, for example, to IETF RFC 4306, etc.). ISAKMP (Internet Security Association and Key Management Protocol)_SA (Security Association) is an SA for encrypting IKE control information for transmission and reception between peers.

Patent Literature 1 discloses a configuration in which a tunnel is established between a router in a user side system connecting to a data center via a communication network, and a virtual router in the data center.

Patent Literature 2 discloses a configuration in which a mobility of a terminal within a local network is supported, a continuous service provision is enabled because a terminal can access to the local network through security and authentication when the terminal moves to an external network.

[Patent Literature 1]
International Publication No. WO2013/190688A1 pamphlet
[Patent Literature 2]
Japanese Patent Kokai Publication No. JP2011-507449A
[Non-Patent Literature 1]
Next-generation Wi-Fi Calling Using IMS and 3GPP Wi-Fi Access, Internet search (searched on 26 Apr. 2015) <URL: http://www.aptilo.com/wi-fi-calling/next-generation-wi-fi-callin g-solution>

SUMMARY

Since a wide area network (WAN) such as the Internet is interposed between a data center, etc., and a wireless LAN (Local Area Network), it is necessary to establish a secure connection.

Accordingly, it is an object of the present invention to provide a system, a method, an apparatus, and a non-transitory medium for enabling secure connection between a data center and a terminal adapted to connect with the data center via a wireless LAN, and a wide area network (WAN) such as the Internet.

According to one aspect of the present invention, there is provided a communication system comprising a data center with a wide area network being interposed between the data center and a wireless LAN (Local Area Network) to which a terminal connects to, wherein the data center comprising:

a VPN apparatus that connects with the terminal using a VPN (Virtual Private Network) through the wide area network and the wireless LAN; and a virtual core network virtualizing at least a part of constituent elements of a core network, wherein the VPN apparatus is connected to the virtual core network, and the terminal communicates with a connection destination, from the VPN via the VPN apparatus, via the virtual core network, and further via a packet data network to which the virtual core network connects.

According to another aspect of the present invention, there is provided a communication apparatus arranged in a data center wherein a wide area network is interposed between the data center and a wireless LAN (Local Area Network) to which the terminal connects, comprising a VPN apparatus that performs connection between the terminal with the communication apparatus with a VPN (Virtual Private Network) via the wireless LAN and through the wide area network, wherein the VPN apparatus is connected to a virtual core network in the data center, the virtual core network virtualizing at least a part of constituent elements of a core network, and wherein the terminal communicates with a connection destination, from the VPN via the VPN apparatus, via the virtual core network, and further via a packet data network to which the virtual core network connects.

According to still another aspect of the present invention, there is provided a communication method comprising:

performing connection using a VPN (Virtual Private Network) via a wireless LAN (Local Area Network) and via a wide area network, between a terminal and a data center with the wide area network interposed between the data center and the wireless LAN to which the terminal connects;

terminating the VPN by a VPN apparatus in the data center, connecting to a virtual core network in the data center, the virtual core network virtualizing at least a part of constituent elements of a core network; and the terminal communicating with a connection destination, from the VPN via the virtual core network, and further via a packet data network to which the virtual core network connects.

According to still another aspect of the present invention, there is provided a terminal adapted to connect with a data center via a wireless LAN (Local Area Network) and a wide area network, comprising:

an VPN (Virtual Private Network) apparatus that performs connection between the terminal and the data center by a VPN (Virtual Private Network) via the wireless LAN and via the wide area network, wherein the terminal connects through the VPN to a virtual core network provided in the data center, the virtual core network virtualizing at least a part of the constituent elements of a core network, and communicates, via a packet data network to which the virtual core network connects, with a connection destination.

According to another aspect of the present invention, there is provided a non-transitory computer readable medium storing a program to cause a computer arranged in a data center wherein a wide area network is interposed between the data center and a wireless LAN (Local Area Network) to which the terminal connects, to execute processing comprising:

establishing a VPN (Virtual Private Network) via the wide area network and via the wireless LAN between the terminal and the data center;

causing a virtual core network provided in the data center virtualizing at least a part of constituent elements of a core network to make the terminal connecting via the VPN to the virtual core network communicate through a packet data network to which the virtual core network connects, with a communication destination.

According to yet another aspect of the present invention, there is provided a non-transitory computer readable medium storing a program to cause a computer included in a terminal adapted to connect with a data center via a wireless LAN (Local Area Network) and a wide area network, to execute processing comprising:

establishing a VPN (Virtual Private Network) via the wireless LAN and via the wide area network between the data center and the terminal; and connecting to a virtual core network provided in the data center virtualizing at least a part of the constituent elements of a core network, and communicating, through a packet data network to which the virtual core network connects, with a connection destination.

According to the present invention, the non-transitory computer readable medium may be a storage such as a semiconductor memory, a CD (Compact Disk)/DVD (Digital Versatile Disk), or the like in which the program is recorded.

According to the present invention, it is possible to provide secure connection between a data center and a terminal adapted to connect with the data center via a wireless LAN and a wide area network (WAN) such as the Internet. Still other features and advantages of the present invention will become readily apparent to those skilled in this art from the following detailed description in conjunction with the accompanying drawings where only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIG. 3A is a diagram illustrating an embodiment of the present invention.

FIG. 3B is a diagram illustrating a VPN information storage unit of the gateway.

FIG. 3C is a diagram illustrating a VPN information storage unit of the terminal.

DETAILED DESCRIPTION

The following describes example embodiments of the present invention. According to the example embodiment of the present invention, in a communication system in which a virtualized core network is arranged in a data center of a cloud operator, a secure connection (voice call/SMS and data communication) with the data center is realized for access from non-3GPP access network.

In SDN (Software Defined Network)/NFV (Network Function Virtualization), a plurality of network apparatuses, each of which individually require a housing (casing), are integrated on a server using virtualization technology. Regarding NFV, reference may be made to ETSI GS NFV-MAN 001 V1.1.1 (2014-12), etc.

Virtualization of an evolved packet core (EPC) or the like, which is a core network of a telecommunication carrier, is in progress. In a virtualized EPC (vEPC), at least one or all of functions of nodes such as SGW, PGW, MME, HSS, PCRF, etc., are realized based on software by an application operating on a virtual machine. For example, a virtualized EPC (vEPC) is realized on a general-purpose server or the like disposed in a data center (DC) of a cloud operator that provides a cloud service (or data center service) to a client.

Figure 1:
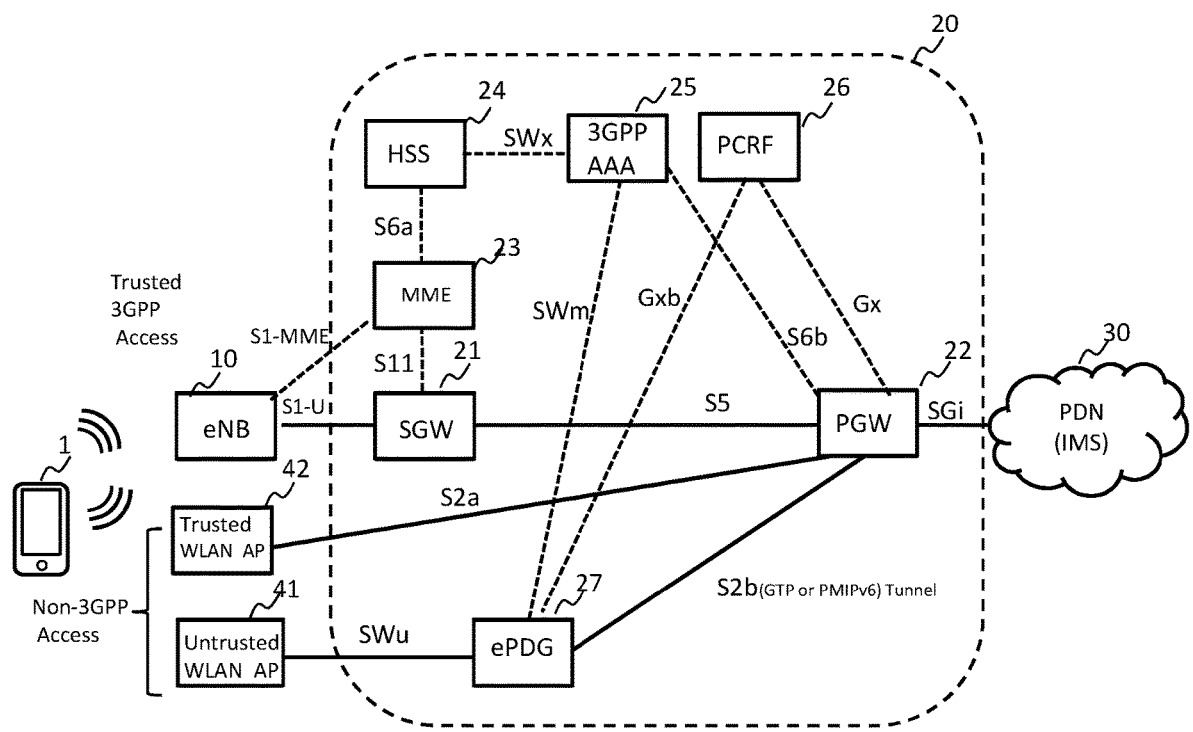
FIG. 1 is a diagram illustrating a related art.
Figure 2:
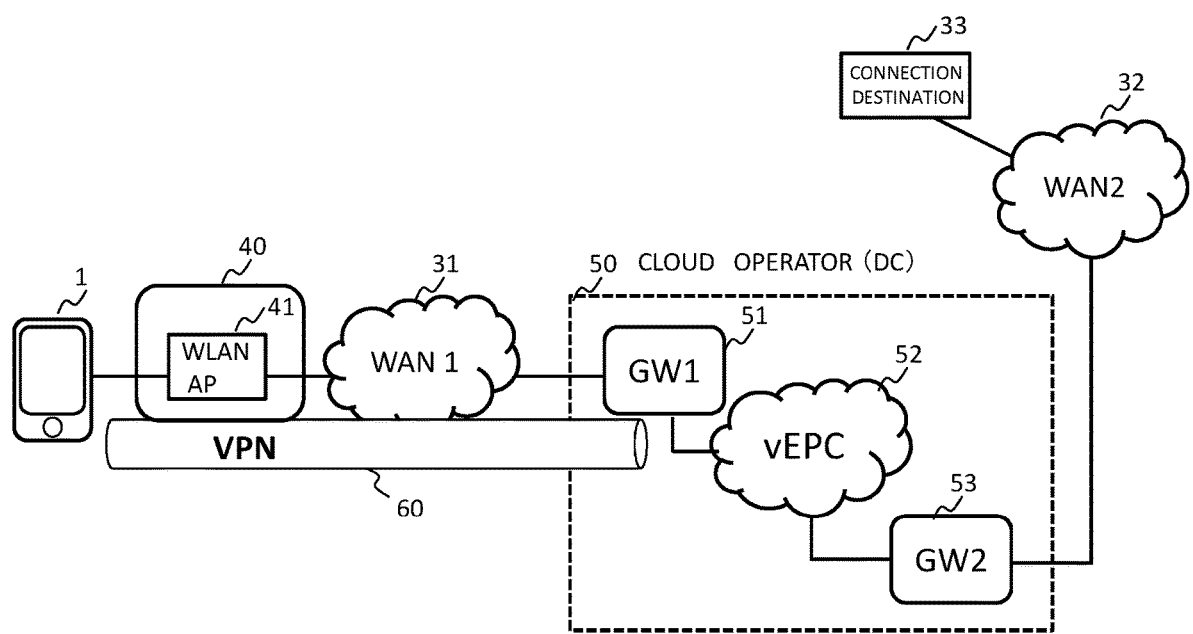
FIG. 2 is a diagram illustrating an embodiment of the present invention.

FIG. 2 is a diagram illustrating an example embodiment of the present invention. A virtualized EPC (vEPC) 52 in a data center 50 is a virtualized version of at least a part of the EPC 20 in FIG. 1. That is, the vEPC 52 may be a virtualized version of functions of some nodes of the EPC 20 such as ePDG 27. PGW 22. PCRF 26, etc., of the EPC 20 in FIG. 1.

A first gateway 51 (Ingress gateway: GW1) connects a virtual EPC (virtual EPC: vEPC) 52 with a wide area network (WAN) 1 (31) such as the Internet. The second gateway 53 (Egress gateway: GW2) connects a WAN2 (32) such as the Internet, and IMS, with the virtualized EPC 52. The terminal 1 may perform switching of setting to access the data center 50 via a wireless LAN (WLAN) 40 such as a Wi-Fi (registered trademark), or the like.

The wireless LAN (WLAN) 40 may be a home wireless LAN or a public wireless LAN. The wireless LAN 40 includes a wireless LAN access point (WLAN AP), a wireless LAN router equipped with NAT (Network Address Transformation)/NAPT (Network Address Port Translation) and the like, and connects to the WAN1 (31) via a modem or the like.

When using a voice call via the WLAN 40 (for example, Wi-Fi (registered trademark)-Calling), the terminal 1 communicatively connects via the WLAN 40 and the WAN1 (31), and through the first gateway 51, the vEPC 52, and the second gateway 53 to a connection destination 33 that connects to the WAN2 (32).

In the case where the WAN2 (32) is an IMS (IP Multimedia Subsystem), for example, a SIP (Session Initiation Protocol) message transmitted from the terminal 1 is sent from a proxy session control function P-CSCF (Proxy Call Session Control Function) to a serving session control function S-CSCF (Serving Call Session Control Function) on a home network side of the IMS and analyzed, and then a SIP message is sent to a S-CSCF on a called side or media gateway control function MGCF. From the S-CSCF on the called side, the Internet, another IMS, or a MGW (Media Gateway) between an IP network and an existing telephone network, or from a SGW (Signaling Gateway) that is provided between a Circuit Switched (CS) network and the IP network and terminates a call control signal from an SS7 common line signaling network and converts the call control signal to a call control signal on the IP network, a communication service is provided to a line switching domain or the like.

In FIG. 2, since the WAN (Wide Area Network) 31 such as the Internet is interposed between the data center 50 and the wireless LAN 40, it is necessary to establish a secure connection.

As described above, according to the present embodiment, in the configuration in which the virtualization core network is arranged in the data center of the cloud operator, it is possible to realize secure connection to the data center for access from a non-3GPP access network Telephone/SMS and data communication).

A VPN tunnel is established between the terminal 1 and a gateway (for example, the first gateway 51) in the data center 50 with the WAN (31) interposed between the data center 50 and the wireless LAN access point 41 to which the terminal 1 connects.

In this case, a VPN apparatus (VPN router, etc.) may be installed in the first gateway 51 to function as a VPN gateway. A VPN apparatus is installed in the terminal 1 to function as a VPN client, for example. In the terminal 1, a VPN connection with the data center 50 via the WLAN 40 is set up. The VPN connection includes tunneling and encryption. When the WAN1 (31) is the Internet, this VPN is a so-called Internet VPN.

Although not particularly limited thereto, the first gateway 51 as a VPN gateway, performs such processing as follows:

Establishment of a VPN tunnel between first gateway 51 and the terminal 1 via a wireless LAN, and WAN1;
Negotiation of security parameters;
User authentication;
Assigning private IP addresses;
Data encryption and decryption;
Management of security keys;
Management of data transfer via a VPN tunnel;
Management of transmission and reception data transmission as an endpoint of a VPN tunnel or a router, and so forth.

It is noted that assignment of private IP addresses may be performed not by the gateway 51 but by PGW or the like in the vEPC 52.

As a VPN tunneling protocol, there are PPTP (Point-to-Point Tunneling Protocol), L2TP (Layer 2 Tunneling Protocol), IPsec, GRE (Generic Route Encapsulation), and the like. A protocol that performs encryption is IPsec. When IPsec is used as the VPN tunneling protocol, as described above, it is encapsulated by the ESP protocol. For IPSec-SA setting, key exchange is performed by IKE protocol (in IKE, port 500 of UDP (User Datagram Protocol) is used).

For example, since a router, or the like installed in a wireless LAN connects to a plurality of terminals (VPN clients), it has a NAPT function that converts a private IP address and a global IP address of a terminal, and a port number in a Transmission Control Protocol (TCP)/User Datagram Protocol (UDP) header.

Figure 10A:
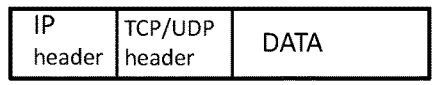
FIG. 10A illustrates an IP packet.
Figure 10B:
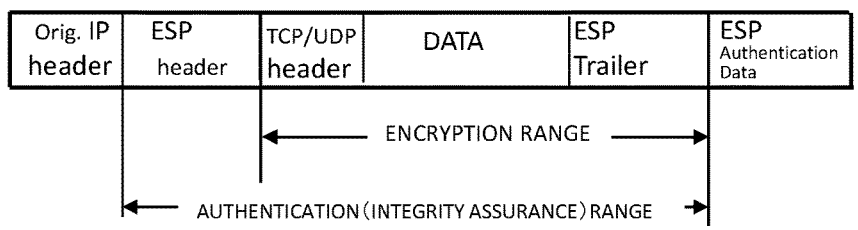
FIG. 10B illustrates an ESP packet in a transform mode.
Figure 10C:
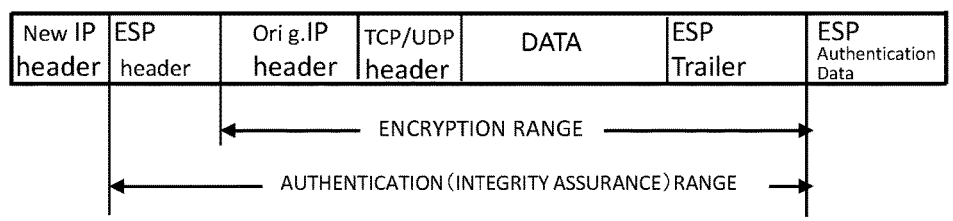
FIG. 10C illustrates an ESP packet in a tunnel mode.

In a tunneling mode of IPSec, an IP header and a data portion (FIG. 10A) are collectively encrypted, and a new IP header (New IP Header in FIG. 10C) is added and transmitted (IETF RFC 4303). In NAPT, an IP address field of an IP header and a port number of a TCP/UDP header are changed. In an ESP protocol, as shown in FIG. 10C, an ESP header (SPI, Serial Number) is placed next to the IP header, and there is no port number field in the ESP header. Therefore, NAPT for address translation does not work. That is, if a NAPT exists between the terminal 1 and the first gateway 51 in FIG. 2, the VPN using IPsec will not be established by the NAPT.

Figure 10D:
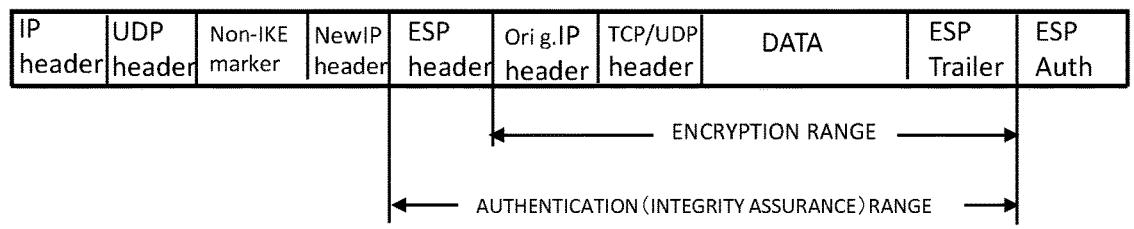
FIG. 10D illustrates a UDP encapsulation.

In this case, in order to make IPsec VPN correspond to NAPT, as shown in FIG. 10D, UDP encapsulation (UDP Encapsulation of IPsec Packets) method in which a UDP header is added to the ESP packet, may be used. In the case of a UDP capsulation, in FIG. 10D, the first IP header is an IP header used for forwarding, and source and destination port numbers of the added UDP header are 500 which is the same port number used in IKE. When the port number is changed by NAT/NAPT, the changed number is used as it is. A checksum field (checksum) of the added UDP header is set to 0. A non-IKE marker following the UDP header is setting information for distinguishing it from the IKE packet (in which 0 is entered). This is to indicate that the packet is not an IKE packet, because the port number of the added UDP header uses the same port number as the port number of the IKE packet. In this portion of the IKE packet, a cookie (cookie) value, for example, a cookie value generated by an initiator of the negotiation of ISAKMP_SA and a cookie value generated by a response side of the negotiation of ISAKMP_SA are included.

Figure 10E:
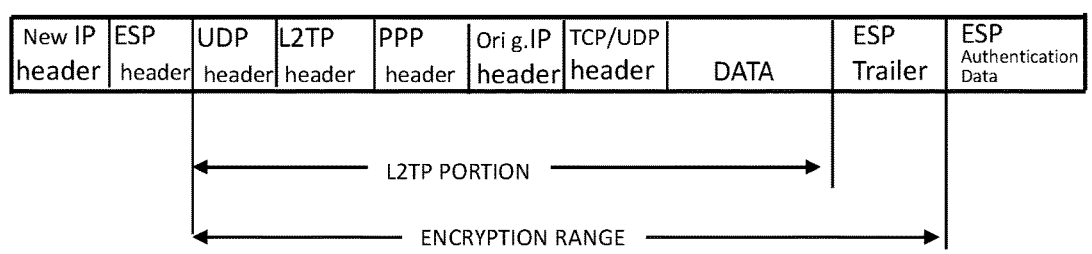
FIG. 10E illustrates an L2TP/IPsec packet.

L2TP, by encapsulating a Point-to-Point Protocol (PPP) frame with UDP, enables exchange the encapsulated frame over the IP network and realizes VPN between two sites. LAC (L2TP Access Concentrator) and LNS (L2TP Network Server). L2TP/IPsec is a protocol that performs encryption by IPsec in L2TP which does not have a mechanism of encryption. In L2TP/IPsec, a connection (SA) by IPSec is first established. FIG. 10E is a diagram illustrating a packet format of L2TP/IPsec.

In order to make a VPN tunnel correspond to NAT/NAPT, in addition to UDP encapsulation, a NAT traversal method that automatically detects NAT by detecting a change in an IP address or a port number may be used.

Next, a procedure of setting up a VPN tunnel using IPsec between the VPN client (terminal 1) and the VPN gateway (GW 51) will be described.
(1) Key generation information is generated and exchanged from a pre-shared key set with a communication partner by IPsec communication, an IKE SA (ISAKMP SA) is established, and the key is created from the key creation information (IKE Phase 1). Note that the authentication algorithm, the encryption algorithm, and the pre-shared key are the same between the VPN client (terminal 1) and the VPN gateway (GW 51).
(2) Next, an IPsec tunnel for data communication is set up. Communication on IKE SA is performed and SA for data communication is established. If the authentication algorithm and key are the same as those of the connection destination, IPsec SA is established. A key for communication with IPsec SA (IKE Phase 2) is created. IPsec disappears within a certain time. IKE SA is kept for a long time as compared with IPsec SA.
(3) Next, encryption and decryption are performed on data to be encrypted using the encryption algorithm and a key created by IPsec SA. The encrypted data is transferred over IPsec SA. As the encryption algorithm, DES (Data Encryption Standard), 3DES (Triple Data Encryption Standard), or the like may be used, and MD5 (Message Digest Five), SHA-1 (Secure Hash Algorithm) or the like is used as the authentication algorithm.

FIG. 3A is a diagram illustrating a configuration of the terminal 1 and the VPN apparatus of the first gateway 51 in the data center 50. A VPN setting unit 512 of the VPN apparatus 511 of the first gateway 51 controls VPN setting and stores setting information in the VPN information storage unit 513. A VPN communication control unit 514 controls the connection of the VPN tunnel (IKE phases 1 and 2), and controls communication of data communication via the VPN tunnel by encryption and decryption. The terminal 1 has the same configuration.

In the case of IPsec VPN, when setting the VPN tunnel in the first gateway 51, the VPN setting unit 512 sets a VPN identifier (VPN tunnel identifier) for identifying the VPN, a pre-shared key, a communication target (name, etc.), an authentication algorithm, an encryption algorithm, presense or absence of IKE keep-alive (when disconnecting VPN, reconnecting). Furthermore, a network address (IP address+ netmask) of a route is set as routing information. Furthermore, the presence/absence of user authentication by XAUTH (eXtended AUTHENTICATION) and presence/absence of NAT traversal are set. XAUTH encrypts and exchanges a user name and a password between a VPN remote client and a server after IKE phase 1 (apparatus authentication), and performs user authentication.

Also in the VPN setting unit 102 of the VPN apparatus 101 of the terminal 1, a setting name, a pre-shared key, a client name, a connection destination gateway (IP address or name), an authentication algorithm, an encryption algorithm, a connection destination network, presence/absence of NAT traversal, etc. are set.

In the VPN information storage unit 513 may include, for example,
IKE cryptographic algorithms (3DES-CBC (Cipher Block Chaining Mode), DES-CBC, AES (Advanced Encryption Standard)—CBC);
IKE hash algorithm (MD5, SHA-1);
Encapsulation of ESP (Encapsulated by UDP and transmitted/received so as to enable IPsec communication in an environment not able to pass ESP by NAT);
Pre-shared key (pre-shared-key);
The policy of SA (for example, policy identifier (Policy_ID), VPN gateway identifier (gateway), authentication header (AH), authentication algorithm, a network identifier of an own apparatus's side and a network identifier of a target side);
Transport mode definition (source port list, destination port list), and
Presence or absence of NAT traversal, and so forth,
These items of information may be set by the command input by the VPN setting unit.

FIG. 3B is a diagram illustrating one example of the VPN management information set by the VPN setting unit 512 and stored in the VPN information storage unit 513. The VPN is given a VPN identifier and managed for each terminal (user). In FIG. 3B, a connection partner IP address is a private IP address (local IP address) of the VPN client (terminal 1) allocated by the first gateway 51 or the like (DHCP server). The terminal ID/name of the connection destination may be an ID of the terminal 1 (for example, IMSI (International Mobile Subscriber Identity)) or the user ID. The apparatus address is an IP address of the VPN tunnel side of the first gateway 51 (router). A connection network is a network to which the VPN communication is transmitted, and is a network address of the VPN tunnel side. In the example of FIG. 3B, an IP address assigned to the terminal 1 in FIG. 3A is set to 100.1.100.1 and an IP address assigned to a connection network is set to 100.1.100.1 (net mask: 32) which is an IP address assigned to the terminal 1. A packet addressed to the terminal 1 from the data center 50 is searched by a wireless LAN router connected to the WAN1 (31) and transmitted via the wireless LAN access point connected to the corresponding port to the terminal 1 by VPN. In a case where a plurality of wireless LAN access points are included in one WLAN, in addition to the IP address of the terminal 1, the terminal ID, or the like, as VPN management information, for example, there may be provided a name of a wireless LAN access point name (APN) of the connection destination of the terminal 1, or port information of a wireless LAN router to which the wireless LAN access point connects, or the like. It is noted that the VPN information shown in FIG. 3B is an example, and it is as a matter of course that the present invention is not limited to such a configuration.

FIG. 3C is a diagram illustrating an example of VPN management information set by the VPN setting unit 102 of the VPN client terminal 1 and stored in the VPN information storage unit 103. A connection destination may be designated by a host name of the site (for example, Fully Qualified Domain Name (FQDN) of the data center 50). The connection network is a network to which a VPN communication from the VPN client (terminal 1) is transmitted and is a network address of a VPN tunnel side of the first gateway 51. A connection network is set to a VPN side address of the first gateway 51: 100.1.1.0/24 (netmask: 24).

The VPN communication control units 514 and 104 terminate the VPN tunnel, manage the security key, manage the data transfer via the VPN tunnel, control transmission of the transmission/reception data as the VPN tunnel end point or the router, encrypt the data and packet transfer by encapsulation, decapsulation and decryption of a packet.

In FIG. 3B and FIG. 3C, an example of IPv4 (Internet Protocol Version 4) is illustrated, but it is a matter of course that it is not limited to IPv4. Also, IP addresses in FIG. 3B and FIG. 3C are imaginary addresses.

In FIG. 3B and FIG. 3C, an example in which an IPsec tunnel is used as the VPN tunnel has been described, but when L2TP/IPsec is used, an L2TP tunnel is arranged in the IPsec tunnel. A connection control message and a session control message are used for establishing the L2TP tunnel. When constructing a VPN with L2TP/IPsec, a session is established by a session control message after creating a tunnel with a connection control message.

As described above, the VPN is allocated in units of terminals (terminal ID, common account). In FIG. 3B, in addition to a user ID, a field of the terminal ID/name may be a user account (for example: "aaa@example.com") provided to the user by a cloud company of the data center 50. That is, in the first gateway 51, in addition to an IP address of the terminal 1 (VPN client), information specific to a user (a user account or a Web mail address, etc.) may be used for management of the VPN.

When the terminal 1 first accesses the wireless LAN access point 41, the wireless LAN access point 41 forwards an access request packet from the terminal 1 to the main data center 50 via the WAN1 (31). The first gateway 51 of the data center 50 assigns an IP address (private IP address) to the terminal 1 and puts up a VPN tunnel 60. When the VPN tunnel 60 is an IPsec tunnel, the establishment of IKE SA (IKE phase) 1, and the establishment of IPsec SA (IKE phase 2) are performed as described above, and encrypted communication is performed on the IPsec SA.

Figure 4:
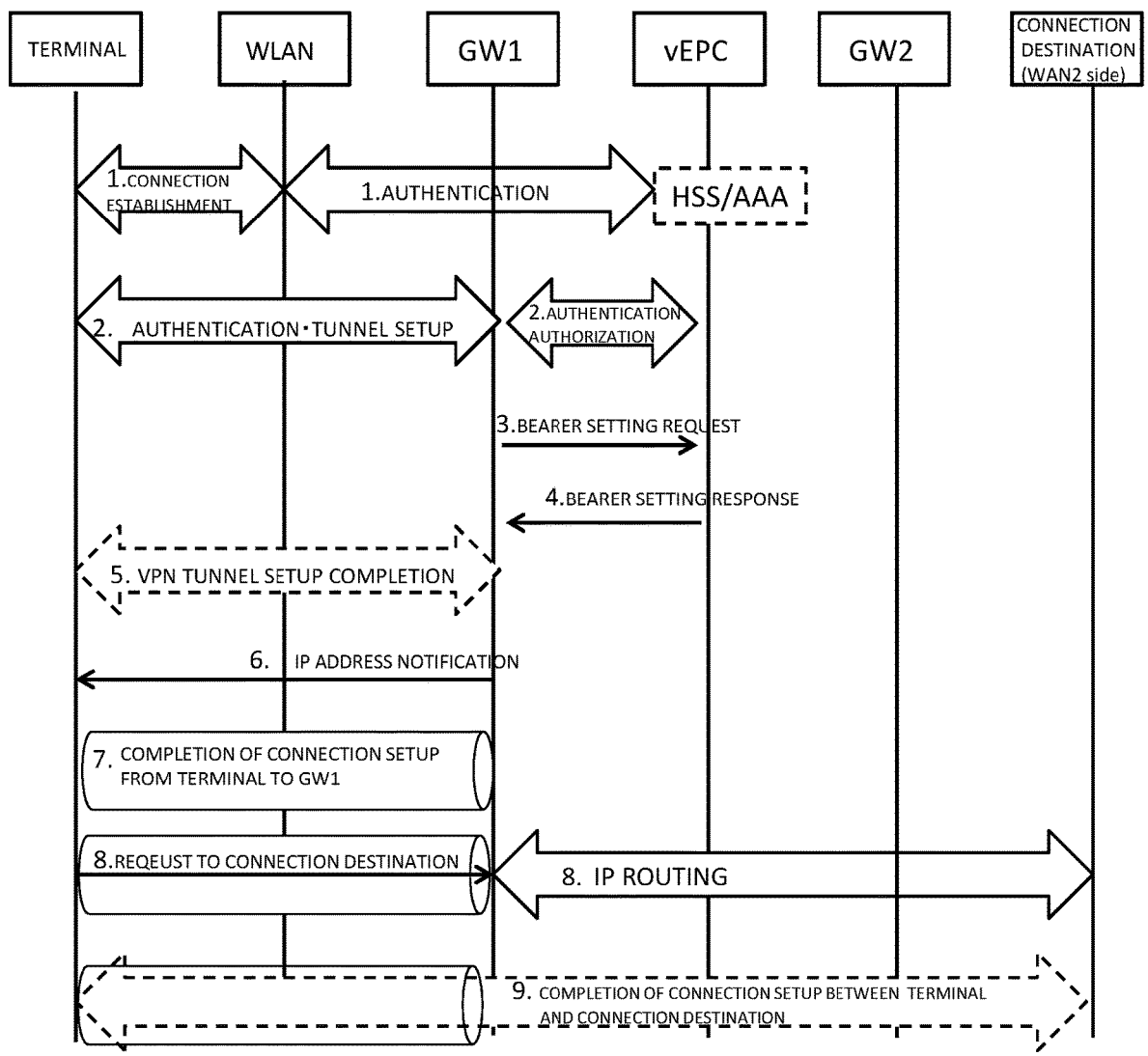
FIG. 4 is a diagram illustrating an operation of an embodiment of the present invention.

FIG. 4 is a diagram for explaining an example of an attach process of the terminal 1 and a sequence to be connected to a connection destination that is connected to the WAN2 (32) in the system of the embodiment of FIG. 2. In FIG. 4, there is schematically shown an example of an operation sequence of the terminal 1, the WLAN 40 (WLAN AP), the first gateway 51, the vEPC 52, the second gateway 53 (GW 2), and the connection destination on the side of the WAN2 (32) in FIG. 2. The numbers assigned to each sequence operation are sequence numbers for explanation.

1. The terminal 1 establishes a connection with the wireless LAN (WLAN) 40, and authentication and authorization (authentication & authorization) is performed by, for example, HSS/AAA (not shown) in the vEPC 52. In the example of FIG. 4, it is assumed that the first gateway 51 is set as a gateway to which the terminal 1 is connected, when accommodating the wireless LAN 40 which is non-3GPP wireless access (Untrusted Non-3GPP IP Access) which is not reliable for security.

2. From the terminal 1 side, the IKE authentication/tunnel setup procedure with the first gateway (GW1) 51 is executed. This corresponds to the IKE phases 1 and 2 described above. It may be an IKEv2 authentication tunnel setup.

3. The vEPC 52 includes an SGW and a PGW. When the setting of the bearer is required, the first gateway (GW1) 51 may function as an MME and transmit a bearer setting request (Create Session Request) to the SGW. In this case, a PGW connected to the packet data network of the connection destination is selected, and a GTP (GPRS (General Packet Radio System) Tunneling Protocol) tunnel is established in the S8 interface between the SGW and the PGW.

4. A bearer setting response (Create Session Response) is transmitted from the SGW of the vEPC 52 to the first gateway (GW1) 51 functioning as the MME.

5. This completes the setup of the IPsec VPN tunnel.

6. The IP address assigned to the terminal 1 is notified to the terminal 1 from the first gateway (GW1), using the IKEv2 message.

7. The IP connection from the terminal 1 to the first gateway (GW1) is set at this point. The above corresponds to the sequence of the attach process.

8. Upon reception of a connection request to the connection destination on the WAN2 (32) side from the terminal 1 side, IP routing from the first gateway (GW1) 51 to the connection destination (WAN2 side) is performed.

9. This completes the setting of connection, from the terminal 1 via the VPN and the vEPC 52 of the data center 50, with the connection destination on the WAN2 side. A packet in a downlink direction from the WAN2 (32) side to the terminal 1 is forwarded by the PGW in the vEPC 52 to the first gateway 51 according to a policy such as PCRF, and then forwarded from the first gateway 51 via the VPN tunnel 60 to the terminal 1.

Figure 5:
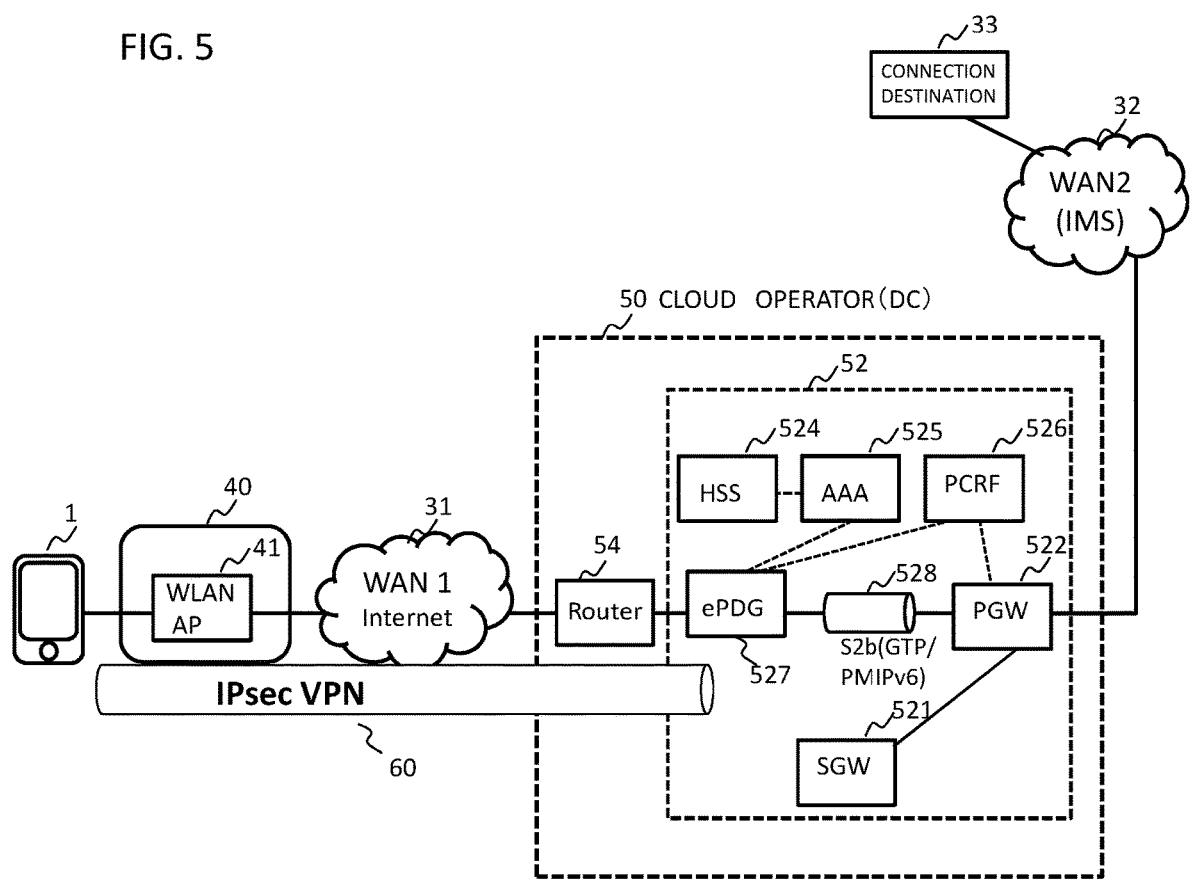
FIG. 5 is a diagram illustrating an embodiment of the present invention.

FIG. 5 is a diagram illustrating an example of the above-described embodiment. Referring to FIG. 5, an IPsec tunnel is established between the ePDG 527 of the vEPC 52 in the data center 50 and the terminal 1. The ePDG 527 functions as a VPN gateway and terminates the VPN tunnel.

The ePDG 527 functions as a VPN gateway to perform such processing as follows:
  Establishment of a VPN (IPsec) tunnel with the terminal 1 via the wireless LAN 40, and WAN1 (31);
  Negotiation of security parameters;
  User authentication;
  Assigning a private IP address to terminal 1;
  Data encryption and decryption;
  Management of security keys;
  Management of data forwarding via VPN tunnel; and
  Management of transmission and reception of data as an endpoint of VPN tunnel.

It is noted that the assignment of the private IP address to the terminal 1 may be performed by the PGW 522 of the vEPC 52.

The EAP message is transmitted to the ePDG 527 from the terminal 1 using IKEV 2, and relayed to the 3GPP AAA server 525 of the vEPC 52, where the EAP-SIM/EAP-AKA authentication is performed. The ePDG 527 of the vEPC 52 and the PGW 522 are connected via GTP or PMIPv6 tunnel.

In the case where a proxy mobile IP (PMIPv6 tunnel) is used between the PGW 522 and the ePDG 527 in the vEPC 5, when an IPsec tunnel is established between the terminal 1 and the ePDG 527 of the vEPC 52, the ePDG 527 transmits a proxy binding update (Proxy Binding Update) to the PGW 522. As a result, in the PGW 522 of the vEPC 52, the destination of an incoming call to the terminal 1 is switched to the ePDG 527 of the vEPC 52, and the incoming call is notified to the terminal 1 via the VPN tunnel 60 and via the wireless LAN 40.

In FIG. 5, the ePDG 527 and the PGW 522 are implemented as the vEPC 52. However, the ePDG 527 and the PGW 522 may be ePDG 27 and PGW 22 (FIG. 1) of MNO (Mobile Network Operator) that a cloud operator as MVNO (Mobile Virtual Network Operator) has borrowed from the MNO. Wi-Fi (registered trademark)-Calling is controlled as a communication service by a cloud operator (MVNO). In addition, the SGW 521 is connected to the access of the data center 50 from at 3GPP access network (not shown).

Figure 6:
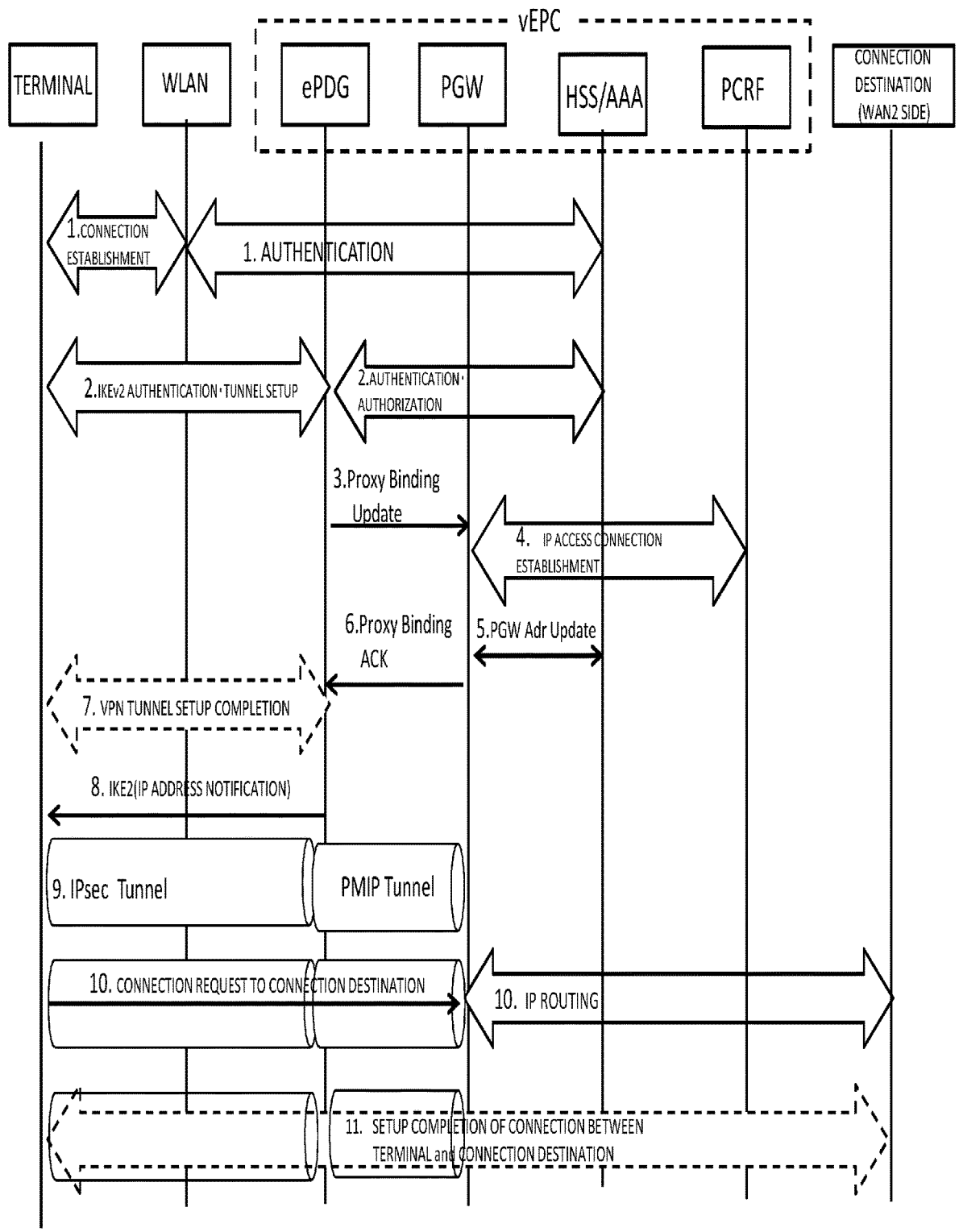
FIG. 6 is a diagram illustrating the operation of one embodiment of FIG. 5.

FIG. 6 is a diagram for explaining an attach processing of the terminal 1 and a sequence for communication connection to a connection destination that connects to the WAN2 (32) in the system of FIG. 5. FIG. 6 illustrates an example of an operation sequence in the terminal 1, WLAN 40 (WLAN AP), ePDG 527, PGW 522, HSS 524/AAA server 525, PCRF 526, and a connection destination on side of WAN2 (32) in FIG. 5. The numbers assigned to each sequence operation are sequence numbers for explanation. In FIG. 6, for example, when replacing the ePDG 527 with the first gateway (GW1) and replacing the PGW 522 with the second gateway (GW2), the operation can partially correspond to the operation described with reference to FIG. 4.

1. The terminal 1 establishes a connection with the wireless LAN (WLAN) 40, and performs authentication/authorization (Authentication & Authorization), for example, by the HSS 524/AAA 525 in the vEPC 52.

2. From the terminal 1 side, the IKEv2 authentication/tunnel setup procedure between the ePDG 527 and the terminal 1 (IKEv2 phases 1 and 2, etc.) is executed.

3. The ePDG 527 transmits to the PGW 522 a Proxy Binding Update (request message transmitted by MAG (Mobile Access Gateway) to LMA (Local Mobility Anchor), in order to establish a binding between a mobile node's home network prefix and the MAG to which the mobile node is connected).

4. The PGW 522 cooperates with the PCRF 526 to establish an IP connection access network (IP-CAN (Connection Access Network)) session.

5. The PGW 522 notifies the AAA server 525 of identification information (PGW ID) of the PGW, and the AAA server 525 notifies the HSS 524 of an ID of the PGW 522 and an APN (Access Point Name) corresponding to the terminal 1 for registration.

6. The PGW 522 performs a proxy binding update processing and creates a binding cache entry corresponding to the terminal 1. As a result, the PGW 522 transmits a packet addressed to the terminal 1 to the ePDG 527 in accordance with contents held in the binding cache entry. The PGW 522 transmits a Proxy Binding Ack to the ePDG 527.

7. The above completes the setup of the IPsec VPN tunnel.

8. An IP address is notified from the ePDG 527 to the terminal 1 by an IKEv2 message.

9. Setup of IP connection from the terminal 1 is completed. An Psec tunnel between the terminal 1 and the ePDG 527 and a tunnel such as PMIP (Proxy Mobile Internet Protocol) between the ePDG 527 and the PGW 522 are established. The above corresponds to the sequence of the attach process.

10. When a connection request from the terminal 1 side to a connection destination of the WAN2 (32) side is received from the ePDG 527 via the PMIP tunnel, IP routing from the PGW 522 to the connection destination (WAN2 side) is performed. In this case, a SIP message from the terminal 1 is transmitted to the P-CSCF of the IMS via the second gateway 53 and is connected via S-CSCF, MGCF, and MGW to the connection destination of PSTN (Public Switched Telephone Networks), for example. Alternatively, it may be connected from the S-CSCF to the Internet or a connection destination connected to the other IMS. In FIG. 6, it is assumed that the terminal 1 has already been registered in the IMS. The P-CSCF of IMS and the PGW 522 (SGi interface) communicate with IPsec (VPN).

11. This completes the setting of the connection with the connection destination on the WAN2 side via the VPN from the terminal 1 and the vEPC 52 of the data center 50. A packet in a downlink direction from the WAN2 (32) side to the terminal 1 is forwarded to the ePDG 527 via the PIMP tunnel to the ePDG 527 by the PGW 522 in the vEPC 52 based on a binding cashe entry, and forwarded from the ePDG 527 to the terminal 1 via the VPN tunnel 60.

Figure 9:
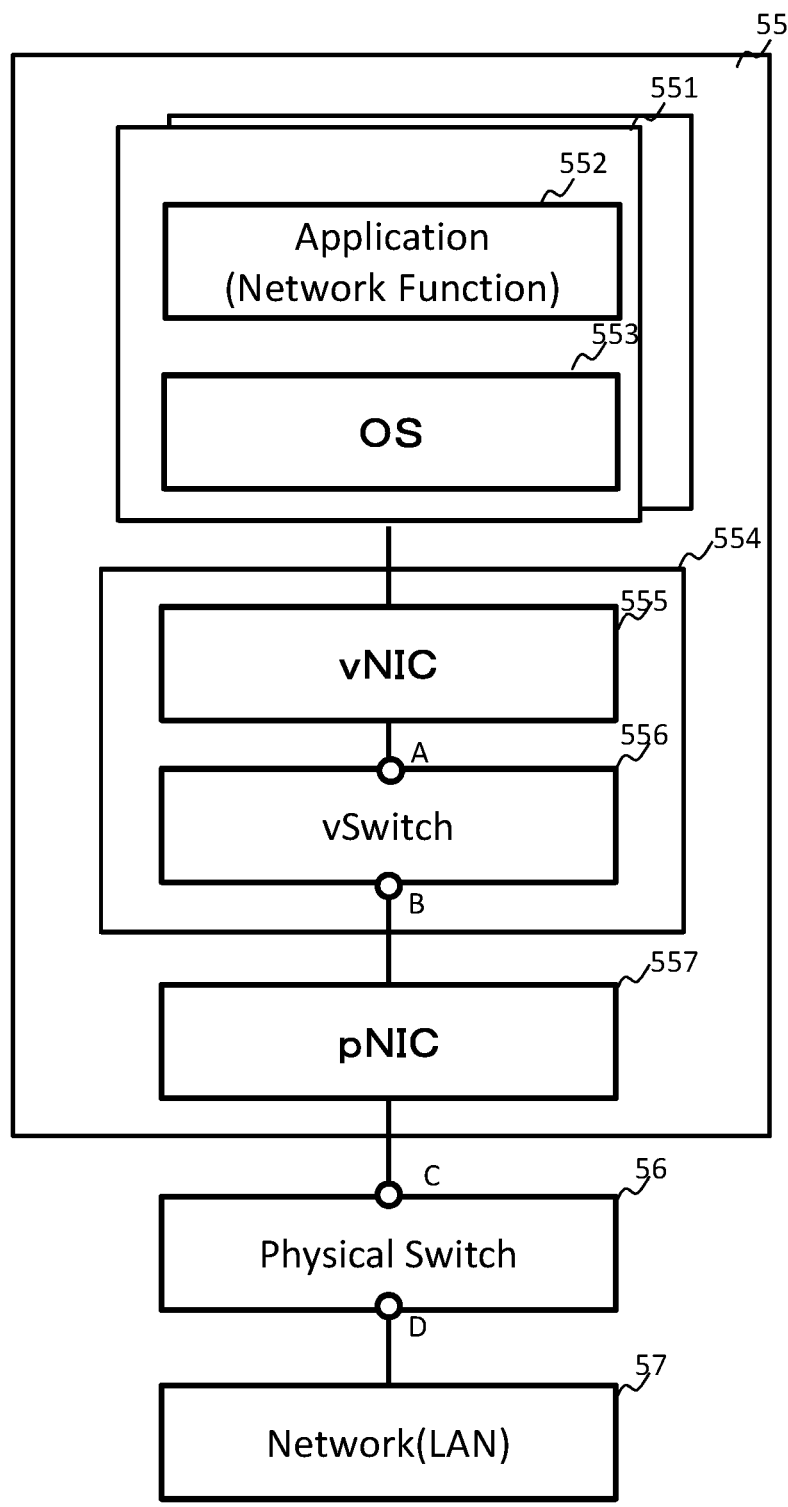
FIG. 9 is a diagram illustrating a configuration of a virtualization apparatus.

The following describes a configuration example of a node of vEPC 52. FIG. 9 is a diagram illustrating the configuration example of the node of vEPC 52. A virtual machine (VM) 571 on a server 57 provided in the data center 50 connects to a virtual port: A of a virtual switch (vSwitch) 576 via a virtual network interface controller (vNIC) 575, and is connected from a virtual port: B of the virtual switch (vSwitch) 576 to a physical port C of a physical switch (Physical Switch) 58 via a physical NIC (pNIC) 577 and is connected to the physical port C of the physical switch 58 through a physical port D of the physical switch 58 to a network (virtual network) 59 such as a LAN. The virtual machine 571 includes a guest OS (Operating System) 573 and an application 572 to realize a part or all of functions of the EPC network node (for example, functions of the ePDG 527 in FIG. 5 or functions of other nodes). The network 59 is connected, for example, to the first gateway (router) 51 in FIG. 5.

A virtual NIC (vNIC), a virtual switch (vSwitch), and the like are provided by a hypervisor 574 which is a virtualization mechanism on the server 57. It is noted that the physical switch 58 may be configured by an L2 (Layer 2) switch and the network 59 may be configured by a virtual network such as a VLAN (Virtual LAN). In FIG. 9, management units of NFV (Network Functions Virtualization) (NFV Orchestrator (NFVO), and VNF (Virtualized Network Function) Manager. or the like), that is a manager that manages and integrates virtualization of network functions are omitted.

Figure 7A:
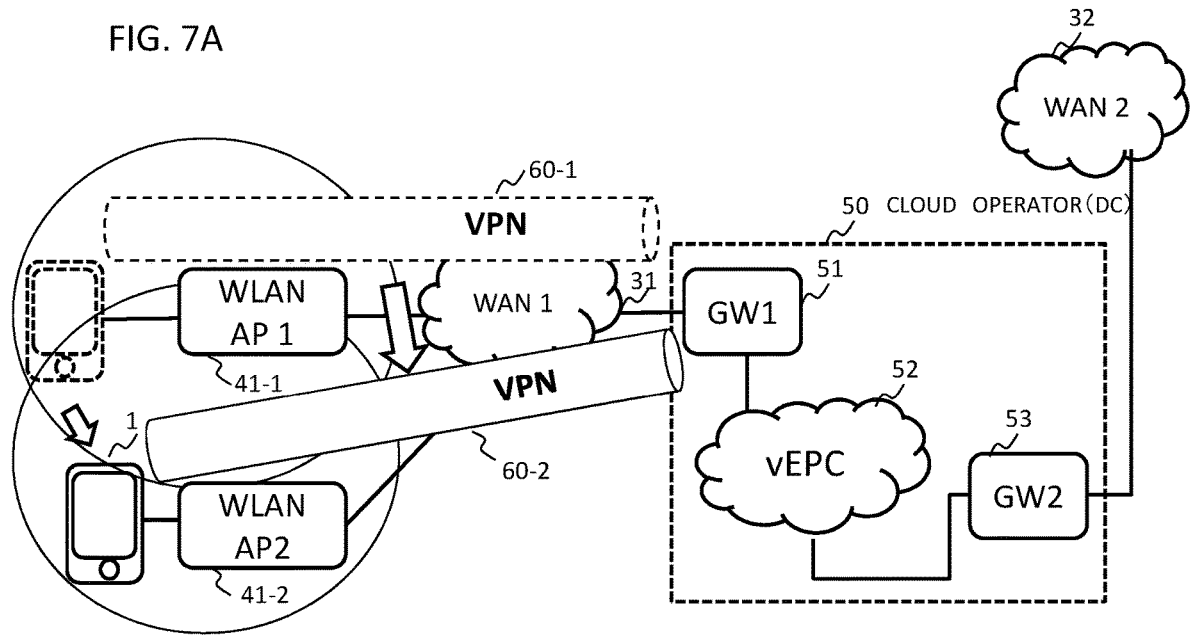
FIG. 7A is a diagram illustrating another embodiment of the present invention.

FIG. 7A is a diagram illustrating another example embodiment. When a location of the terminal 1 that has been accessing a wireless LAN access point 1 (41-1) has changed due to movement or the like, the access is switched to a wireless LAN access point 2 (41-2). When a radio field strength of the wireless LAN access point 1 (41-1) to which the terminal 1 currently belongs is reduced due to movement or the like, and falls below a predetermined threshold value, whereas a radio field strength of another wireless LAN access point 2 (41-2) exceeds the threshold value, the terminal 1 performs hands over to the other wireless LAN access point 2 (41-2). It is assumed that ESSID (Extended Service Set Identifier: an identifier of a network in the IEEE 802.11 series wireless LAN) of the wireless LAN access points 41-1 and 41-2 are the same. In this case, the terminal 1 releases connection of a VPN tunnel 60-1 between the wireless LAN access point and the gateway 51, and newly establishes a VPN tunnel 60-2 between the wireless LAN access point 2 (41-2) and the gateway 51. It is noted that switching of a connection destination from the wireless LAN access point 1 (41-1) to the wireless LAN access point 2 (41-2) may be performed manually on the terminal 1.

Alternatively, when the terminal 1 is within a range of a plurality of wireless LAN access points, a wireless LAN access point having the highest priority (for example, based on a received signal strength (Received Signal Strength Indicator: RSSI), policy setting on a side of the terminal, etc.) may be selected. For example, when connecting to a wireless LAN, the terminal 1 may be provided with a function that searches one or more wireless LAN access points whose radio wave intensity is equal to or greater than a predetermined threshold value, and when as a result of the search, one or more candidate wireless access points are searched, selects and connects the wireless access point with the highest radio field strength.

In case where the terminal 1 connects to the wireless LAN, other than selecting the wireless LAN access point, when the terminal 1 is being connected to the wireless access point, and a wireless LAN access point with a radio signal strength intensity better than that of a currently connected wireless access point is searched, the terminal may switch to wireless LAN access point with the highest radio signal strength intensity. When a wireless LAN access point with a radio signal strength intensity better than that of a currently connected wireless access point is not found, the terminal may keep connection with to the wireless LAN access point to which the terminal 1 currently connects.

In addition to a received signal strength, a wireless LAN access point of a connection destination may be selected from the terminal 1 side by policy setting, etc., on the terminal 1 side. In selecting the wireless LAN access point by the terminal 1, the terminal 1 may perform handoff by performing a search (broadcasting of a probe packet, and reception of a response packet), authentication, and connection procedure.

Alternatively, it is possible to select a wireless LAN access point by using ANDI (access network discovery information) or ISRP (Inter-System Routing Policy) delivered to subscriber terminals from an ANDSF (Access Network Discovery and Selection Function) server (3GPP TS 23.402) (not shown). ANDI is location information of a wireless LAN access point and authentication information necessary for connection. ISRP is a communication control policy that designates a radio access network to be used for communication defined by IP address, application name, domain name, and the like.

Figure 7B:
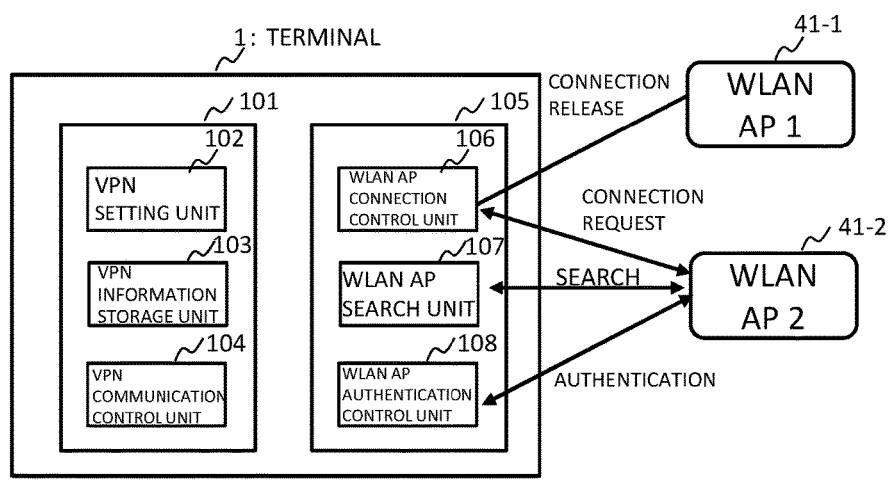
FIG. 7B is a diagram illustrating the terminal of FIG. 7A.

FIG. 7B is a diagram illustrating a configuration of the terminal 1. In the terminal 1, a VPN apparatus 101 is the same as the VPN apparatus 101 in FIG. 3A. A wireless LAN access point (WLAN AP) selection switching apparatus 105 includes a WLAN AP connection control unit 106, a WLAN AP search unit 107, and a WLAN AP authentication control unit 108.

The wireless LAN access point (WLAN AP) searching unit 107 searches for a wireless LAN access point. As described above, the WLAN AP searching unit 107 may search for a wireless LAN access point whose received signal strength intensity is equal to or higher than a predetermined threshold value. The WLAN AP connection control unit 106 controls connection/disconnection with the wireless LAN access point. The WLAN AP connection control unit 106 releases a connection of a VPN tunnel 60-1 in FIG. 7A, for example, and controls a connection with a VPN tunnel 60-2. The WLAN AP authentication control unit 108 performs mutual authentication with the wireless LAN access point. When authenticated by the WLAN AP authentication control unit 108, the WLAN AP connection control unit 106 performs an association request and a response with a new wireless LAN access point. The WLAN AP search unit 107 receives a beacon signal broadcast from a wireless LAN access point, mutually confirms ESSID. When ESSID is confirmed, processing may be shifted to an authentication phase by the WLAN AP authentication control unit 108. Alternatively, if a probe request (ESSID) is transmitted from the terminal 1 and a response is obtained from the wireless LAN access point, processing may be shifted to the authentication phase by the WLAN AP authentication control unit 108.

Even if the wireless LAN access point to which the terminal 1 connects changes to the wireless LAN access point 41-2, if the WLANs are the same (the same ESSID), a VPN tunnel is established using the same terminal ID (user account) as the VPN tunnel 60-1, on the data center 50 side, regarding the VPN tunnel 60-2.

That is, with respect to a new VPN tunnel 60-2 with the terminal 1 via the wireless LAN access point 41-2 in the VPN information storage section 513 (FIG. 3A) of the gateway 51, VPN management information (FIG. 3B) may be the same as the VPN tunnel 60-1. It is noted that a wireless LAN handover function of the WLAN AP selection switching unit 105 in the terminal 1 may be configured such that the wireless LAN handover function of the terminal 1 is turned on or off. In this case, for example, in order to avoid consumption of a battery of the terminal 1, it is possible to select to turn off the wireless LAN handover function.

Switching a VPN tunnel (switching from the VPN tunnel 60-1 to the VPN tunnel 60-2) does not matter whether the terminal 1 is talking via the wireless LAN or a call is interrupted.

Figure 8:
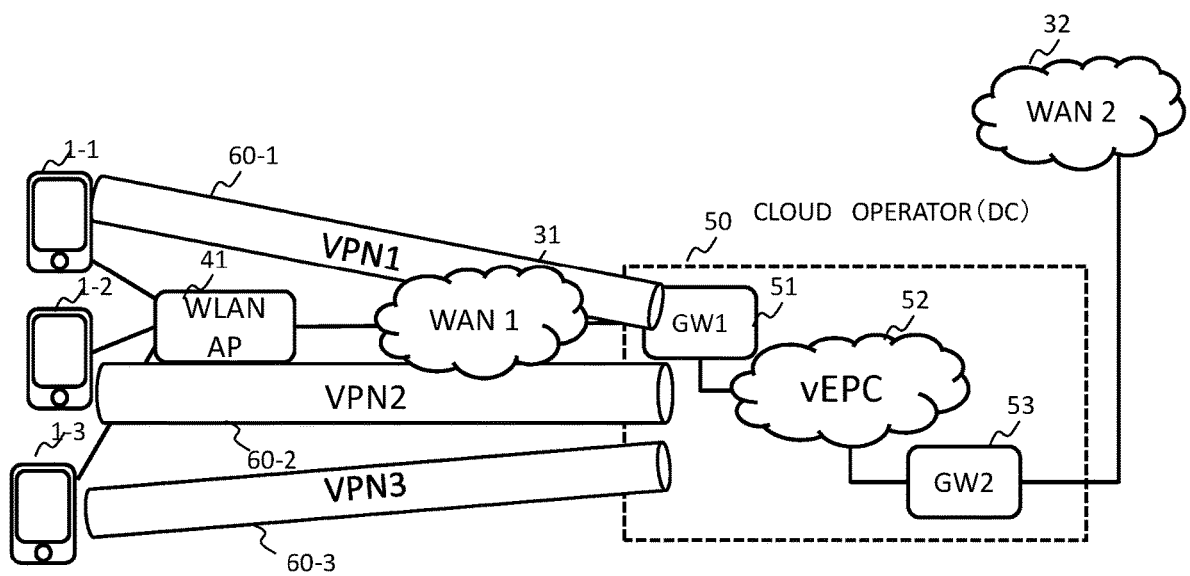
FIG. 8 is a diagram illustrating another embodiment of the present invention.

Still another example embodiment of the present invention will be described. In the embodiment in FIG. 8, terminals 1-1, 1-2, and 1-3 complying with the vEPCs 52 of the data centers 50 of a plurality of cloud providers access a single wireless LAN access point 41.

The data center 50 manages a VPN for each of the terminals 1-1 to 1-3 and each user account, and accommodates a plurality of VPN tunnels 60-1 to 60-3 at the same time. The configuration, and operation of each of the terminals 1-1 to 1-3 are the same as those in the above embodiment.

When a plurality of terminals connects to one wireless LAN access point 41, a plurality of terminals share a radio wave for communication, and when a plurality (many) terminals access one wireless LAN access point 41, throughput (such as an amount of data transfer per unit time) of each terminal is reduced. Therefore, there may be provided a wireless LAN controller (not shown) that that controls to disperse load by allocating as a connection destination of a plurality of terminals, a wireless access point different from the wireless access point with access concentrated, when a plurality of terminals connects to one wireless LAN access point 41, access to which is concentrated.

The disclosure of the above Patent Literatures 1 and 2 are incorporated herein by reference. Within the framework of the entire disclosure (including the scope of claims) of the present invention, it is possible to change/adjust the embodiment or example based on the basic technical concept. Also, various combinations or selections of various disclosed elements (including each element of each claim, each element of each embodiment, each element of each drawing, etc.) are possible within the scope of the claims of the present invention. That is, it goes without saying that the present invention includes various modifications and modifications that could be made by those skilled in the art according to the entire disclosure including the claims, and technical concepts.

The above-described embodiments may be attached, for example, as follows (but not limited to the following).

(Supplementary Note 1)

A communication system comprising: a data center with a wide area network being interposed between the data center and a wireless LAN (Local Area Network) to which a terminal connects to, wherein the data center comprises: a VPN apparatus that connects with the terminal using a VPN (Virtual Private Network) through the wide area network and the wireless LAN; and a virtual core network virtualizing at least a part of constituent elements of a core network, wherein the VPN apparatus is connected to the virtual core network, wherein the terminal communicates with a connection destination, from the VPN via the VPN apparatus, via the virtual core network, and further via a packet data network to which the virtual core network connects.

(Supplementary Note 2)

The communication system according to supplementary note 1, wherein the terminal receives an incoming call or data destined to the terminal from the packet data network side, via the virtual core network of the data center and through the VPN from the VPN apparatus of the data center.

(Supplementary Note 3)

The communication system according to supplementary note 1 or 2, wherein the VPN apparatus of the data center manages the VPN between the terminal and the VPN apparatus, on a per terminal basis or on a per terminal user basis.

(Supplementary Note 4)

The communication system according to any one of supplementary notes 1 to 3, wherein when switching from one wireless LAN access point to which the terminal connects, to another wireless LAN access point, the terminal releases a VPN tunnel via the one wireless LAN access point between the terminal and the VPN apparatus of the data center, and establishes a new VPN tunnel between said terminal and the VPN apparatus of the data center via the other wireless LAN access point.

(Supplementary Note 5)

The communication system according to any one of supplementary notes 1 to 4, wherein the terminal comprises a unit that selects a wireless LAN access point to which the terminal connects.

(Supplementary Note 6) The communication system according to supplementary note 3, wherein a plurality of terminals connecting to one wireless LAN access point, connect with the VPN apparatus of the data center, respectively by a plurality of the VPNs.

(Supplementary Note 7)

The communication system according to any one of supplementary notes 1 to 6, wherein the VPN apparatus is arranged in a gateway in the data center or in a predetermined node in the virtual core network.

(Supplementary Note 8)

A communication apparatus arranged in a data center wherein a wide area network is interposed between the data center and a wireless LAN (Local Area Network) to which the terminal connects, the communication apparatus comprising:

a VPN apparatus that performs connection between the terminal and the communication apparatus using a VPN (Virtual Private Network) extending through the wireless LAN and the wide area network, wherein the VPN apparatus is connected to a virtual core network in the data center, the virtual core network virtualizing at least a part of constituent elements of a core network, and wherein the terminal communicates with a connection destination, from the VPN via the VPN apparatus, via the virtual core network, and further via a packet data network to which the virtual core network connects.

(Supplementary Note 9)

The communication apparatus according to supplementary note 8, wherein the VPN apparatus manages the VPN between the terminal and the VPN apparatus, on a per terminal basis or on a per terminal user basis.

(Supplementary Note 10)

The communication apparatus according to supplementary note 8, wherein the terminal receives an incoming call or data destined to the terminal from the packet data network side, via the virtual core network of the data center and through the VPN from the VPN apparatus of the data center.

(Supplementary Note 11)

A communication method comprising:

performing connection between a terminal and a data center, using a VPN (Virtual Private Network) through a wireless LAN (Local Area Network) and a wide area network, the wide area network being interposed between the data center and the wireless LAN to which the terminal connects;

terminating the VPN by a VPN apparatus in the data center, the VPN apparatus connecting to a virtual core network in the data center, the virtual core network virtualizing at least a part of constituent elements of a core network; and the terminal communicating, from the VPN via the VPN apparatus, via the virtual core network, and further via a packet data network to which the virtual core network connects, with a connection destination.

(Supplementary Note 12)

The communication method according to supplementary note 11, comprising:

the terminal receiving an incoming call or data destined to the terminal from the packet data network side, via the virtual core network of the data center and through the VPN.

(Supplementary Note 13)

The communication method according to supplementary note 11 or 12, comprising:

when switching from one wireless LAN access point to which the terminal connects, to another wireless LAN access point, the terminal releasing a VPN tunnel via the one wireless LAN access point between the terminal and the VPN apparatus of the data center, and establishing a new VPN tunnel between the terminal and the VPN apparatus of the data center via the other wireless LAN access point.

(Supplementary Note 14)

The communication method according to any one of supplementary notes 11 to 13, comprising:

the terminal selecting a wireless LAN access point to which the terminal connects.

(Supplementary Note 15)

The communication method according to any one of supplementary notes 11 to 14, comprising managing the VPN between the terminal and the VPN apparatus, on a per terminal basis or on a per terminal user basis.

(Supplementary Note 16)

The communication method according to supplementary note 15, comprising a plurality of terminals that connect to one wireless LAN access point, connecting with the VPN apparatus of the data center, respectively by a plurality of the VPNs.

(Supplementary Note 17)

A terminal adapted to connect with a data center via a wireless LAN (Local Area Network) and a wide area network, comprising:

an VPN (Virtual Private Network) apparatus that performs connection between the terminal and the data center using a VPN (Virtual Private Network) through the wireless LAN and the wide area network, wherein the terminal communicates with a connection destination, from the VPN, via a virtual core network provided in the data center, the virtual core network virtualizing at least a part of the constituent elements of a core network, and further, via a packet data network to which the virtual core network connects.

(Supplementary Note 18)

The terminal according to supplementary note 17, wherein, when switching from one wireless LAN access point to which the terminal connects, to another wireless LAN access point, releases a VPN tunnel via the one wireless LAN access point between the terminal and the VPN apparatus of the data center, and establishes a new VPN tunnel between the terminal and the VPN apparatus of the data center via the other wireless LAN access point.

(Supplementary Note 19)

The terminal according to supplementary note 17 or 18, comprising a unit that selects a wireless LAN access point to which the terminal connects.

(Supplementary Note 20)

The terminal according to any one of supplementary notes 17 to 19, wherein the terminal receives an incoming call or data destined to the terminal from the packet data network side, via the virtual core network of the data center and through the VPN.

(Supplementary Note 21)

A non-transitory computer-readable medium storing therein a program to cause a computer arranged in a data center wherein a wide area network is interposed between the data center and a wireless LAN (Local Area Network) to which the terminal connects, to execute processing comprising:

establishing a VPN (Virtual Private Network) through the wide area network and the wireless LAN, between the terminal and the data center;

causing a virtual core network provided in the data center virtualizing at least a part of constituent elements of a core network to make the terminal connecting through the VPN to the virtual core network communicate through a packet data network to which the virtual core network connects, with a communication destination.

(Supplementary Note 22)

A non-transitory computer-readable medium storing therein a program to cause a computer included in a terminal adapted to connect with a data center via a wireless LAN (Local Area Network) and a wide area network, to execute processing comprising:

establishing a VPN (Virtual Private Network) through the wireless LAN and via the wide area network, between the data center and the terminal; and communicating with a connection destination, from the VPN, via a virtual core network provided in the data center, the virtual core network virtualizing at least a part of the constituent elements of a core network, and further, via a packet data network to which the virtual core network connects.

What is claimed is:

1. A data center operated by a mobile virtual network operator providing a mobile network service, the data center comprising:

a mobile virtual network configured to provide at least one of a plurality of functions of a mobile network; and a gateway configured to:

receive data from a terminal connected to the mobile virtual network; and terminate a virtual private network connected to an access point, which is connected to the terminal, and a network, which is connected to the access point.

2. The data center according to claim 1, wherein the network is a Wide Area Network.

3. The data center according to claim 1, wherein the gateway receives voice call data from the terminal via the network.

4. The data center according to claim 3, wherein the voice call data is controlled as data related to a communication service provided by the mobile virtual network operator.

5. The data center according to claim 1, wherein the virtual private network is controlled for each of user account of a communication service provided by the mobile virtual network operator.

6. The data center according to claim 1, wherein the virtual private network is controlled for each of mail address of a user of a communication service provided by the mobile virtual network operator.

7. A communication method in a data center operated by a mobile virtual network operator providing a mobile network service, the communication method comprising:

a gateway receiving data from a terminal connected to a mobile virtual network, the mobile virtual network configured to provide at least one of a plurality of functions of a mobile network; and the gateway terminating a virtual private network connected to an access point, which is connected to the terminal, and a network, which is connected to the access point.

8. The communication method according to claim 7, wherein the network is a Wide Area Network.

9. The communication method according to claim 7, wherein the gateway receives voice call data from the terminal via the network.

10. The communication method according to claim 9, wherein the voice call data is controlled as data related to a communication service provided by the mobile virtual network operator.

11. The communication method according to claim 7, wherein the virtual private network is controlled for each of user account of a communication service provided by the mobile virtual network operator.

12. The communication method according to claim 7, wherein the virtual private network is controlled for each of mail address of a user of a communication service provided by the mobile virtual network operator.

* * * * *

UNITED STATES PATENT AND TRADEMARK OFFICE
CERTIFICATE OF CORRECTION

PATENT NO. : 10,764,088 B2
APPLICATION NO. : 16/386896
DATED : September 1, 2020
INVENTOR(S) : Satoru Ishii, Hideo Hasegawa and Shintaro Nakano Page 1 of 1

It is certified that error appears in the above-identified patent and that said Letters Patent is hereby corrected as shown below:

In the Specification

Column 7, Detailed Description, Line 25; Delete "ePDG 27. PGW 22." and insert --ePDG 27, PGW 22,-- therefor Signed and Sealed this
Eighth Day of December, 2020

Andrei Iancu
*Director of the United States Patent and Trademark Office*